US010137611B2

(12) United States Patent
Lim

(10) Patent No.: US 10,137,611 B2
(45) Date of Patent: Nov. 27, 2018

(54) METHOD FOR MANUFACTURING MOLDED ARTICLE USING FOOD WASTE

(71) Applicant: Byeong Geol Lim, Anyang (KR)

(72) Inventor: Byeong Geol Lim, Anyang (KR)

( * ) Notice: Subject to any disclaimer, the term of this patent is extended or adjusted under 35 U.S.C. 154(b) by 329 days.

(21) Appl. No.: 14/889,972

(22) PCT Filed: May 8, 2014

(86) PCT No.: PCT/KR2014/004085
§ 371 (c)(1),
(2) Date: Nov. 9, 2015

(87) PCT Pub. No.: WO2014/182084
PCT Pub. Date: Nov. 13, 2014

(65) Prior Publication Data
US 2016/0067889 A1    Mar. 10, 2016

(30) Foreign Application Priority Data
May 8, 2013  (KR) .......................... 10-2013-0051589

(51) Int. Cl.
*B29C 39/00* (2006.01)
*G09B 19/10* (2006.01)
(Continued)

(52) U.S. Cl.
CPC .......... *B29C 39/003* (2013.01); *B09B 3/0025* (2013.01); *B29B 7/002* (2013.01);
(Continued)

(58) Field of Classification Search
CPC ................ A23G 3/0263; A23G 3/0236; Y10T 29/49826; B29C 64/357; B32B 2272/00; B09B 3/0083
(Continued)

(56) References Cited

U.S. PATENT DOCUMENTS 5,035,189 A    7/1991   Lunsford

FOREIGN PATENT DOCUMENTS

CN    101362977 A    2/2009
CN    102268310 A    9/2012
(Continued)

OTHER PUBLICATIONS

International Search Report for PCT/KR2014/004085 dated Aug. 22, 2014.

*Primary Examiner* — Jason L Vaughan
*Assistant Examiner* — Amanda Meneghini
(74) *Attorney, Agent, or Firm* — STIP Law Group, LLC

(57) ABSTRACT

The present invention relates to a method for manufacturing a molded article using food waste, in which food waste is dried, fractioned and ground, after which the processed food waste is mixed with purified water, a preservative, an aromatic agent and a binding agent comprising a food additive, and the mixture is poured into a fixing mold to be compression-molded into various shapes, e.g., cubes. The molded article can substitute for soaps which have been conventionally used for practicing carving so as to prevent resource waste and environmental contamination. The method for manufacturing a molded article using food waste enables a minimal addition of chemicals during molding so as to provide practice materials which are not harmful to the human body. Another purpose of the present invention is to provide a method for manufacturing a molded article using food waste, in which cubes are manufactured by using food waste, the cubes are combined to form a big cube, and small cubes are sequentially removed from a big cube consisting of small cubes, thereby enabling a model to be modified at the users convenience.

6 Claims, 1 Drawing Sheet

(51) Int. Cl.
*B09B 3/00* (2006.01)
*B29B 7/00* (2006.01)
*B29B 9/12* (2006.01)
*B29B 9/16* (2006.01)
*B29C 59/02* (2006.01)
*B29B 7/74* (2006.01)
*B29K 1/00* (2006.01)
*B29L 31/00* (2006.01)

(52) U.S. Cl.
CPC ............. *B29B 7/7495* (2013.01); *B29B 9/12* (2013.01); *B29B 9/16* (2013.01); *B29C 59/02* (2013.01); *G09B 19/10* (2013.01); *B29C 2059/027* (2013.01); *B29K 2001/00* (2013.01); *B29K 2003/00* (2013.01); *B29L 2031/7722* (2013.01)

(58) Field of Classification Search
USPC ...... 264/911, 920, 921, 36.1, 109, 122, 128; 426/89, 512, 514, 516, 517
See application file for complete search history.

(56) References Cited

FOREIGN PATENT DOCUMENTS

| | | |
|---|---|---|
| CN | 102675714 A | 9/2012 |
| CN | 102807349 A | 12/2012 |
| CN | 102827662 A | 12/2012 |
| EP | 0556774 A2 | 8/1993 |
| JP | 1020040051186 A | 6/2004 |
| JP | 2011057920 A | 3/2011 |
| KR | 10-2006-0100650 A | 9/2006 |
| KR | 10-2011-0055442 A | 5/2011 |
| KR | 10-1103424 B1 | 1/2012 |
| KR | 10-2012-0136787 A | 12/2012 |

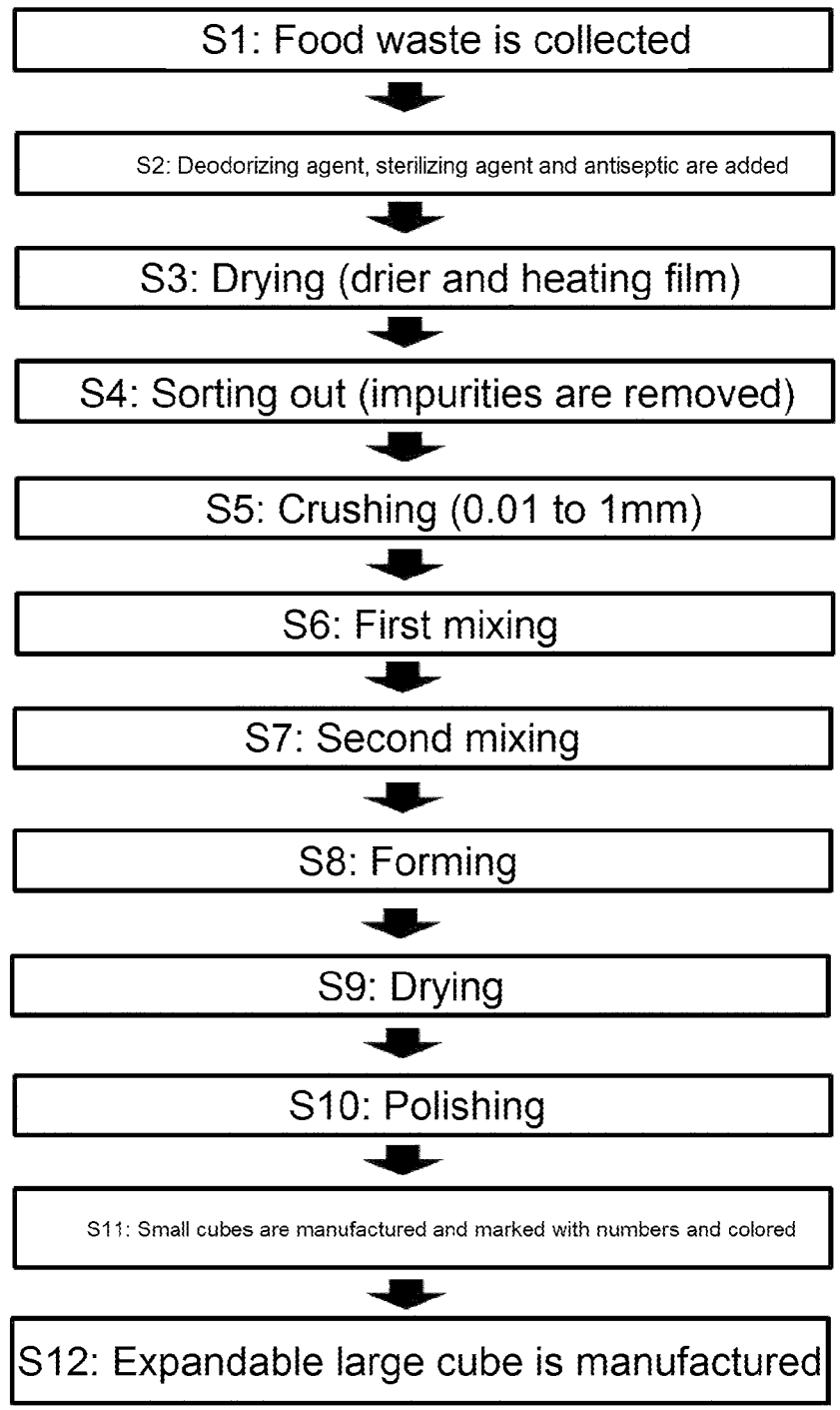

METHOD FOR MANUFACTURING MOLDED ARTICLE USING FOOD WASTE

CROSS-REFERENCE TO RELATED APPLICATIONS

This application is the U.S. National Phase under 35 U.S.C. § 371 of International Application No. PCT/KR2014/004085 filed on May 8, 2014, which in turn claims the benefit of Korean Application No. 10-2013-0051589, filed on May 8, 2013, the disclosures of which are incorporated by reference into the present application.

TECHNICAL FIELD

The present invention relates to a method for manufacturing a molded article using food waste, and in particular to a method for manufacturing a molded article using food waste wherein food waste is collected, and the collected food waste is processed, for example, it is dried, crushed, sterilized, heat-treated and then is mixed with a binding agent, and the mixture is inputted into a paste or a mold to manufacture a predetermined shaped molded article.

BACKGROUND ART

In Korea, the amount of food waste is over 5,000,000 tons per year, and the total cost for treating such food waste is almost 20 trillion won. To cope with this problem, various methods to use food waste for various applications are being proposed, but such methods in most cases are limited to the applications for animal feed or compost. For this reason, there is a limit in recycling food waste. To this end, it needs to develop a new method to efficiently reduce the amount of food waste in such a way to consume food waste by diversifying the method for recycling food waste.

In addition, when elementary school students practice to make sculpture in art classes, they generally use soaps to make sculpture. In this case, about 150,000 pieces of soaps are used per year for elementary school students in 6th grades. The problem is that after practice classes are finished such pieces of soaps are wasted, thus causing a lot of resource consumption and environmental pollution. If a sculpture class is performed using soap which contains a lot of chemical components, there may be an increasing possibility where a critical problem in terms of a health issue may occur, whereupon an environmentally friendly practice material is necessary.

In order to resolve the above mentioned problems, a method for manufacturing a molded article is proposed. In this method, food waste is collected, and the collected food waste is subjected to a drying-sorting-crushing process. The thusly processed food waste is mixed with a purified water and a binding agent, and the mixture is poured into a fixing mold and is compressed and molded into various shapes including a cube shape. This article may be substituted with soaps which was used before in a conventional sculpture class. To this end, resource consumption can be prevented, and environmental pollution can be also prevented. A practice material which is not harmful to a human body can be provided by minimizing the addition of chemical components during molding.

DISCLOSURE OF INVENTION

Accordingly, it is an object of the present invention to provide a method for manufacturing a molded article using food waste which may make it possible to maximize applicability of food waste while providing an environmentally friendly practice material, wherein various types of molded articles including a cube can be manufactured by processing collected food waste.

It is another object of the present invention to provide a method for manufacturing a molded article using food waste which may allow to make a predetermined shape in such a way that a small cube is manufactured using food waste, and another small cube is attached to each side of the small cube, thus manufacturing a large cube, and then the small cubes are sequentially removed in an order described on the manual, thus manufacturing a predetermined shape.

It is further another object of the present invention to provide a method for manufacturing a molded article using food waste which is able to deodorize and prevent rotting during a food waste treatment process.

TECHNICAL SOLUTION

To achieve the above object, there is provided a method for manufacturing a molded article using food waste wherein food waste is collected, and the collected food waste is subjected to a drying-sorting-crushing process. The thusly processed food waste is mixed with a purified water and a binding agent, and the mixture is poured into a fixing mold and is compressed and molded into various shapes including a cube shape.

In addition, to achieve the above object, there is provided a method for manufacturing a molded article using food waste wherein food waste is manufactured into a small cube and is colored, and each small cube is marked with number, and a predetermined small cube is attached to each side of the small cube, thus manufacturing a large cube, and the small cubes with specific numbers are sequentially removed as described on the manual from the small cubes which form the large cube, thus manufacturing colorful and specific shapes.

In addition, to achieve the above object, there is provided a method for manufacturing a molded article using food waste wherein a deodorizing agent and an antiseptic are added during a food waste treatment process.

Advantageous Effects

The present invention is directed to a method for manufacturing a molded article using food waste. A culture practice wherein elementary school students did using soap may be done using a molded article which is manufactured using food waste. It is possible to manufacture a predetermined shape in such a way to sequentially remove as described on the manual the small cubes which form a large cube without carving a molded article.

In addition, an engaging part may be formed at each cube, thus engaging the small cubes into a large cube, and any deformation may be made in such a way to sequentially remove the small cubes as described on the manual, whereupon it can be possible to form food waste into a predetermined shape or other shapes of articles at a users convenience.

BRIEF DESCRIPTION OF DRAWINGS

FIG. 1 is a flow chart illustrating a method for manufacturing a molded article using food waste according to the present invention.

BEST MODES FOR CARRYING OUT THE INVENTION

The present invention is directed to a method for manufacturing a molded article using food waste. The method for manufacturing a molded article using food waste according to the present invention may include, but is not limited to, as illustrated in FIG. 1, a step wherein food waste is collected; a step wherein deodorizing agent, sterilizing agent and antiseptic are added; a step wherein the mixture is dried using a drier and a heating film at above 15° C.; a step wherein particles of food waste are sorted so as to remove impurities; a step wherein the sorted particles are crushed; a first mixing step wherein a fixing agent or/and a binding agent including a food additive is mixed and pasted with the crushed powder; a second mixing step wherein a purified water and an aromatic agent are mixed and pasted with the mixture in the first mixing step; a step wherein the mixture is poured into a mold and is compressed and molded; a drying step wherein the molded article is dried; a polishing step wherein the dried molded article is polished; and a step wherein the small cubes manufactured after the step where the molded article is polished are engaged each other into a large cube, thus manufacturing a specific shape by removing the small cubes from the large cube.

More specifically, food waste including plant leave, fruit skin, coffee grounds, etc. is collected, and with respect to 1 g of the food waste, 0.01~0.5 g of deodorizing agent and 0.01~0.5 g of sterilizing agent are added, and with respect to 1 g of the food waste, 0.01~0.5 g of natural antiseptic is added, and the food waste is dried using a drier which is set at above 15° C. or a heating film, so unnecessary food waste is sorted out and removed. After any impurities are removed from the food waste through the food waste sorting step, with respect to 1 g of the food waste which are crushed into sizes of below 0.01 to 1 mm and have moisture of below 20% after impurities contained in the food waste are removed through the food waste sorting step, 0.001 to 0.5 g of one or more of natural cellulose, hi-cell, Carbomer, carbopolpregel, oliveemulsifiedwax, polyquater, glucamate, methylcellulose, carboxyl methylcellulose, pine resin (resin), carboxyl vinyl polymer, acasiacollagen, CMC (carboxymethyl cellulose), aloeveragel, carbopolpregel, kitrified, silicate, shellac, rubber, resinoid, PVC, PVA, PTFE, aoki, Tamarind Gum, Magnesium flluorosilicate, L-sodium glutamate, sodium polyacrylate, alginic acid propylene glycol, carboxy methyl cellulose calcium sodium, carboxy methyl cellulose calcium, alginic acid sodium, casein, sodium caseinate, glucomannan acid, MC (methylation atelocollagen), maltodextrin, gluten, alginic acid propylenegly-col, carboxy methyl cellulose potassium, natural starch, Food Starch Modified, alginic acid ammonium, glucosamine, guar gum, pectin, carrageenan, arabic gum, locust bean gum, acid bentonite, cellulase, spirulina pigment, cyclodextrin, amylase, petroleum wax, steviol glycosides, Turmeric Oleoresin, dextrin, carnauba wax, fructooligosaccharide, Locust Bean Gum, mannose, galactose, tapioca starch, HPC (Hydroxyrpopyl cellulose), HPC-L, CMC-NA (Carboxymethyl celluose sodium), progelatinized starch, Xanthan gum, Povidone, HPMC (Hydroxypropyl methyl cellulose), PVP (Poly vinyl pyrrolidone), sodium silicate, Silica and Potassium, dextrin arabic rubber, formaldehyde, vitrifid, silicate, shellac, rubber, resinoid, bakelite, rubber, silicate shellac magnesite, agar flour or starch flour is added, and the mixture is pasted so that the crushed particles can be bound, and the mixture is subjected to the first mixing step. The mixture made through the second mixing step is poured into the mold and is subjected to a compressing and molding process. In the second mixing step, with respect to 1 g of the mixture manufactured through the first mixing step, less than 1 mL of a purified water is added, and with respect to 1 g of the first mixture, 0.01 to 0.5 g of aromatic agent is added. If the molded article of the food waste is dried below 5° C., bacteria and fungus may grow, and in case of above 200° C., cracks may occur at the molded article. For this reason, when drying the molded article, the molded article is processed using a polishing agent after the molded article made of the food waste is hardened using the drier which is set between 5° C. to 200° C.

In addition, there is provided a method for manufacturing a molded article using food waste in the following way. Each cube manufactured through the polishing step in the step S10 is colored and marked with number, thus manufacturing the small cube (S11). The small cube is attached to each side of the small cube, thus manufacturing a large cube (S12). The small cubes which are components of the large cube are sequentially removed as described on the manual, thus making a predetermined shape.

The invention claimed is:

1. A method for manufacturing a molded article using food waste, comprising:
   (s1) a step wherein food waste is collected;
   (s2) a step wherein with respect to 1 g of the food waste, 0.01 to 0.5 g of deodorizing agent, 0.01 to 0.5 g of sterilizing agent and 0.01 to 0.5 g of natural antiseptic are added to form a first mixture;
   (s3) a step wherein the first mixture is dried using a drier of above 15° C. and a heating film;
   (s4) a step wherein the particles of the food waste are sorted out to remove impurities;
   (s5) a step wherein the sorted particles of step s4 are crushed into sizes of 0.01 mm to 1 mm to form a crushed powder;
   (s6) a first mixing step wherein a binding agent containing a food additive is mixed and pasted with the crushed powder to form a second mixture;
   (s7) a second mixing step wherein purified water and an aromatic agent are mixed and pasted with the second mixture manufactured in the first mixing step to form a third mixture;
   (s8) a step wherein the third mixture is poured into a mold and is compressed and molded, thus manufacturing the molded article;
   (s9) a drying step wherein the molded article which was manufactured in such a way that it had been compressed and molded is dried;
   (s10) a polishing step wherein the molded article is polished using a polishing agent;
   (s11) a step wherein at least one small cube is manufactured and is marked with a number and is colored, wherein the surface of each small cube is marked with a number or is colored so as to engage or attach each cube, which is manufactured through the polishing step in the step s10; and
   (s12) a step wherein an expandable large cube is manufactured, wherein the expandable large cube is manufactured in such a way to attach the at least one small cube, which is manufactured in the step s11 and is colored and marked with a number, to each side of another small cube which is manufactured in the step s11 and is colored and marked with a number.

2. The method of claim 1, wherein the first mixing step S6 wherein a binding binging agent containing a food additive is mixed and pasted with the crushed powder, includes a step for manufacturing the second mixture in such a way to add, with respect to 1 g of the food waste containing below 20% of moisture, 0.001 to 0.5 g of one binding agent or more of natural cellulose, hi-cell, Carbomer, carbopolpregel, oliveemulsifiedwax, polyquater, glucamate, methylcellulose, carboxyl methylcellulose, carboxyl vinyl polymer, acasiacollagen, CMC(carboxymethyl cellulose), aloeveragel, carbopolpregel, kitrified, silicate, shellac, rubber, resinoid, PVC, PVA, PTFE, aoki, Tamarind Gum, Magnesium flluorosilicate, L-sodium glutamate, sodium polyacrylate, alginic acid propylene glycol, carboxy methyl cellulose calcium sodium, carboxy methyl cellulose calcium, alginic acid sodium, casein, sodium caseinate, glucomannan acid, MC(methylation atelocollagen), maltodextrin, gluten, alginic acid propyleneglycol, carboxy methyl cellulose potassium, natural starch, Food Starch Modified, alginic acid ammonium, glucosamine, guar gum, pectin, carrageenan, arabic gum, locust bean gum, acid bentonite, cellulase, spirulina pigment, cyclodextrin, amylase, petroleum wax, steviol glycosides, Turmeric Oleoresin, dextrin, carnauba wax, fructooligosaccharide, Locust Bean Gum, mannose, galactose, tapioca starch, HPC(Hydroxyrpopyl cellulose), HPC-L, CMC-NA(Carboxymethyl celluose sodium), progelatinized starch, Xanthan gum, Povidone, HPMC(Hydroxypropyl methyl cellulose), PVP(Poly vinyl pyrrolidone), sodium silicate, Silica and Potassium, dextrin arabic rubber, formaldehyde, vitrifid, silicate, shellac, rubber, resinoid, bakelite, rubber, silicate shellac magnesite, agar flour, pine resin(resin) or starch flour, which are binding agents mixed to the food waste which has been subjected to the crushing step s5 in such a way that the sorted particles of step s4 are crushed in a range of 0.01 mm to 1 mm.

3. The method of claim 1, wherein in the second mixing step, wherein purified water and aromatic agent are mixed and pasted with the second mixture manufactured in the first mixing step, with respect to 1 g of the first second mixture manufactured in the first mixing step, purified water of less than 1 mL is added and mixed, and with respect to 1 g of the second mixture, an aromatic agent of 0.01 to 0.5 g is added and mixed.

4. The method of claim 1, wherein in the drying step s9 wherein the molded article which has been compressed and molded, the molded article is dried at 5 to 200° C., which has been manufactured in such a way that the third mixture is poured into a mold and is compressed and molded, the third mixture being manufactured by mixing 1 mL of purified water and 0.01 to 0.5 g of an aromatic agent with respect to 1 g of the second mixture which has been manufactured by adding, with respect to 1 g of the food waste, 0.001 to 0.5 g of a binding agent of one or more of natural cellulose, hi-cell, Carbomer, carbopolpregel, oliveemulsifiedwax, polyquater, glucamate, methylcellulose, carboxyl methylcellulose, carboxyl vinyl polymer, acasiacollagen, CMC(carboxymethyl cellulose), aloeveragel, carbopolpregel, kitrified, silicate, shellac, rubber, resinoid, PVC, PVA, PTFE, aoki, Tamarind Gum, Magnesium flluorosilicate, L-sodium glutamate, sodium polyacrylate, alginic acid propylene glycol, carboxy methyl cellulose calcium sodium, carboxy methyl cellulose calcium, alginic acid sodium, casein, sodium caseinate, glucomannan acid, MC(methylation atelocollagen), maltodextrin, gluten, alginic acid propyleneglycol, carboxy methyl cellulose potassium, natural starch, Food Starch Modified, alginic acid ammonium, pine resin (resin), glucosamine, guar gum, pectin, carrageenan, arabic gum, locust bean gum, acid bentonite, cellulase, spirulina pigment, cyclodextrin, amylase, petroleum wax, steviol glycosides, Turmeric Oleoresin, dextrin, carnauba wax, fructooligosaccharide, Locust Bean Gum, mannose, galactose, tapioca starch, HPC(Hydroxyrpopyl cellulose), HPC-L, CMC-NA(Carboxymethyl celluose sodium), progelatinized starch, Xanthan gum, Povidone, HPMC(Hydroxypropyl methyl cellulose), PVP(Poly vinyl pyrrolidone), sodium silicate, Silica and Potassium, dextrin arabic rubber, formaldehyde, vitrifid, silicate, shellac, rubber, resinoid, bakelite, rubber, silicate shellac magnesite, agar flour or starch flour.

5. The method of claim 3, wherein in the drying step s9 for drying the molded article which has been compressed and molded, the molded article is dried at 5 to 200° C., wherein the molded article has been manufactured in such a way that the third mixture is poured in a mold and is compressed and molded, the third mixture being manufactured in such a way to add, with respect to 1 g of the second mixture, 1 mL of purified water and 0.01 to 0.5 g of an aromatic agent, wherein the second mixture is manufactured by adding with respect to 1 g of the food waste, 0.001 to 0.5 g of a binding agent of one or more of natural cellulose, hi-cell, Carbomer, carbopolpregel, oliveemulsifiedwax, polyquater, glucamate, methylcellulose, carboxyl methylcellulose, carboxyl vinyl polymer, acasiacollagen, CMC(carboxymethyl cellulose), aloeveragel, carbopolpregel, kitrified, silicate, shellac, rubber, resinoid, PVC, PVA, PTFE, aoki, Tamarind Gum, Magnesium flluorosilicate, L-sodium glutamate, sodium polyacrylate, alginic acid propylene glycol, carboxy methyl cellulose calcium sodium, carboxy methyl cellulose calcium, alginic acid sodium, casein, sodium caseinate, glucomannan acid, MC(methylation atelocollagen), maltodextrin, gluten, alginic acid propyleneglycol, carboxy methyl cellulose potassium, natural starch, Food Starch Modified, alginic acid ammonium, glucosamine, guar gum, pectin, carrageenan, arabic gum, locust bean gum, acid bentonite, cellulase, spirulina pigment, cyclodextrin, amylase, petroleum wax, steviol glycosides, Turmeric Oleoresin, dextrin, carnauba wax, fructooligosaccharide, Locust Bean Gum, mannose, galactose, tapioca starch, HPC(Hydroxyrpopyl cellulose), HPC-L, CMC-NA (Carboxymethyl celluose sodium), progelatinized starch, Xanthan gum, Povidone, HPMC(Hydroxypropyl methyl cellulose), PVP(Poly vinyl pyrrolidone), sodium silicate, Silica and Potassium, dextrin arabic rubber, formaldehyde, vitrifid, silicate, shellac, rubber, resinoid, bakelite, rubber, silicate shellac magnesite, pine resin (resin), agar flour or starch flour.

6. A method for manufacturing a molded article using food waste, comprising:
(s1) a step wherein food waste is collected;
(s2) a step wherein with respect to 1 g of the food waste, 0.01 to 0.5 g of deodorizing agent, 0.01 to 0.5 g of sterilizing agent and 0.01 to 0.5 g of natural antiseptic are added to form a first mixture;
(s3) a step wherein the first mixture is dried using a drier of above 15° C. and a heating film;
(s4) a step wherein the particles of the food waste are sorted out to remove impurities;
(s5) a step wherein the sorted particles of step s4 are crushed into sizes of 0.01 mm to 1 mm to form a crushed powder;
(s6) a first mixing step wherein 0.001 to 0.5 g of a binging agent of one or more of natural cellulose, hi-cell, Carbomer, carbopolpregel, oliveemulsifiedwax, polyquater, glucamate, methylcellulose, carboxyl methylcellulose, carboxyl vinyl polymer, acasiacollagen, CMC(carboxymethyl cellulose), aloeveragel, carbopolpregel, kitrified, silicate, rubber, resinoid, PVC, PVA, PTFE, aoki, Tamarind Gum, Magnesium flluorosilicate, L-sodium glutamate, sodium polyacrylate, alginic acid propylene glycol, carboxy methyl cellulose calcium sodium, carboxy methyl cellulose calcium, alginic acid sodium, casein, sodium caseinate, glucomannan acid, MC(methylation atelocollagen), maltodextrin, gluten, alginic acid propyleneglycol, carboxy methyl cellulose potassium, natural starch, Food Starch Modified, alginic acid ammonium, glucosamine, guar gum, pectin, carrageenan, arabic gum, locust bean gum, acid bentonite, cellulase, spirulina pigment, cyclodextrin, amylase, petroleum wax, steviol glycosides, Turmeric Oleoresin, dextrin, carnauba wax, fructooligosaccharide, Locust Bean Gum, mannose, galactose, tapioca starch, HPC(Hydroxyrpopyl cellulose), HPC-L, CMC-NA(Carboxymethyl celluose sodium), progelatinized starch, Xanthan gum, Povidone, HPMC(Hydroxypropyl methyl cellulose), PVP(Poly vinyl pyrrolidone), sodium silicate, Silica and Potassium, dextrin arabic rubber, formaldehyde, vitrifid, silicate, shellac, rubber, resinoid, bakelite, rubber, silicate shellac magnesite, pine resin (resin), agar flour or starch flour is mixed and pasted with respect to 1 g of the food waste to form a second mixture;

(s7) a second mixing step wherein the second mixture manufactured in the first mixing step is mixed and pasted with purified water of less than 1 mL with respect to 1 g of the second mixture and an aromatic agent of 0.01 to 0.5 g with respect to 1 g of the second mixture to form a third mixture;

(s8) a step wherein the molded article is manufactured by pouring the third mixture into a mold and compressing the mold and the mixture thus manufacturing the molded article;

(s9) a drying step wherein the molded article which was manufactured after the third mixture had been compressed and molded is dried at 5 to 200° C.;

(s10) a polishing step wherein the molded article is polished using a polishing agent;

(s11) a step wherein a at least one small cube is manufactured and is marked with a number and is colored, wherein the surface of each small cube is marked with a number or is colored so as to engage or attach each cube which is manufactured through the polishing step in the step s10; and (s12) a step wherein an expandable large cube is manufactured, wherein the expandable large cube is manufactured in such a way to attach the at least one small cube, which is manufactured in the step s11 and is colored and marked with a number, to each side of another small cube which is manufactured in the step s11 and is colored and marked with a number.

* * * * *